(12) United States Patent
Huang

(10) Patent No.: US 12,536,686 B2
(45) Date of Patent: Jan. 27, 2026

(54) CALIBRATION METHOD OF APPARATUS INSTALLATION PARAMETER AND RELATED SURVEILLANCE DEVICE

(71) Applicant: VIVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 305 days.

(21) Appl. No.: 18/380,207

(22) Filed: Oct. 16, 2023

(65) Prior Publication Data

US 2024/0185443 A1 Jun. 6, 2024

(30) Foreign Application Priority Data

Oct. 20, 2022 (TW) .................................. 111139747

(51) Int. Cl.
*G06T 7/60* (2017.01)
*G06T 7/80* (2017.01)

(52) U.S. Cl.
CPC ...... *G06T 7/60* (2013.01); *G06T 2207/30232* (2013.01)

(58) Field of Classification Search
CPC .... G06T 7/60; G06T 2207/30232; G06T 7/80
USPC ........................................................ 382/103
See application file for complete search history.

(56) References Cited

U.S. PATENT DOCUMENTS

| 2003/0179922 A1* | 9/2003 | Peters | G06T 7/70 |
| | | | 382/153 |
| 2021/0097717 A1 | 4/2021 | Wang | |
| 2023/0136084 A1* | 5/2023 | Perrault | G06T 7/97 |
| | | | 348/187 |

FOREIGN PATENT DOCUMENTS

| CN | 109163928 A | 1/2019 |
| TW | 201643775 A | 12/2016 |
| TW | 201931307 A | 8/2019 |

* cited by examiner

*Primary Examiner* — Jennifer Mehmood
*Assistant Examiner* — Dustin Bilodeau
(74) *Attorney, Agent, or Firm* — Winston Hsu

(57) ABSTRACT

A calibration method of apparatus installation parameter is applied to a surveillance device having an image receiver and an operation processor. The calibration method includes analyzing a detection image from the image receiver to acquire an apparatus installation parameter of the surveillance device, computing a height of at least one target object inside the detection image in accordance with the apparatus installation parameter, analyzing the height of the at least one target object via an error function to acquire an error computed value, computing a local minimal value of the error computed value relevant to the apparatus installation parameter via a gradient descent function, and finding the local minimal value to acquire an installation parameter vector so that the surveillance device executes analysis of the detection image according to the installation parameter vector.

20 Claims, 5 Drawing Sheets

CALIBRATION METHOD OF APPARATUS INSTALLATION PARAMETER AND RELATED SURVEILLANCE DEVICE

BACKGROUND OF THE INVENTION

1. Field of the Invention

The present invention relates to a calibration method applied for apparatus installation parameters and a related surveillance device, and more particularly, to a calibration method applied for the apparatus installation parameters to effectively provide preferred calibration accuracy and a related surveillance device.

2. Description of the Prior Art

A conventional surveillance camera calibrates an apparatus installation parameter by referring to a size of the actual object. The commonly used actual object is a pedestrian within a surveillance region of the surveillance camera. The surveillance camera can acquire a human average height of the area where on the surveillance camera is located, and a pedestrian height computed by the detection image can be compared with the human average height, so as to calibrate the apparatus installation parameter of the surveillance camera. However, the human average height may have obvious differences in different countries or regions, and height distribution may be different in different places, so that the apparatus installation parameter cannot be accurately calibrated via the foresaid data. Thus, a calibration method applied for the apparatus installation parameter and having preferred calibration accuracy is an important issued in the related surveillance industry.

SUMMARY OF THE INVENTION

The present invention provides a calibration method applied for the apparatus installation parameters to effectively provide preferred calibration accuracy and a related surveillance device for solving above drawbacks.

According to the claimed invention, a calibration method is applied for at least one apparatus installation parameter of a surveillance device having an image receiver and an operation processor. The calibration method includes analyzing a detection image from the image receiver to acquire the apparatus installation parameter of the surveillance device, computing at least one target object height inside the detection image in accordance with the apparatus installation parameter, operation processor utilizing an error function to analyze the at least one target object height for acquiring an error computation value, operation processor utilizing a gradient descent function to compute a local minimal value of the error computation value relevant to the apparatus installation parameter, and acquiring an installation parameter vector by the local minimal value so that the surveillance device analyzes the detection image in accordance with the installation parameter vector.

According to the claimed invention, a surveillance device includes an image receiver and an operation processor. The image receiver is adapted to acquire a detection image. The operation processor is electrically connected to the image receiver in a wire manner or in a wireless manner, and is adapted to analyze the detection image to acquire the apparatus installation parameter of the surveillance device, compute at least one target object height inside the detection image in accordance with the apparatus installation parameter, utilize an error function to analyze the at least one target object height for acquiring an error computation value, utilize a gradient descent function to compute a local minimal value of the error computation value relevant to the apparatus installation parameter, and acquire an installation parameter vector by the local minimal value so that the surveillance device analyzes the detection image in accordance with the installation parameter vector.

The calibration method applied for the apparatus installation parameter and the surveillance device of the present invention can utilize the predefined installation parameter to compute the reference object height inside the detection image, and compare the reference object height with the predefined object height for estimating the apparatus installation parameter of the surveillance device. Since the predefined object heights in different countries or regions are different, the present invention can further utilize the estimated apparatus installation parameter to compute the target object height inside the detection image; the target object can have the same specification in different countries or regions. Then, the present invention can further utilize the commonly used or the specially designed error function and the gradient descent function to converge the target object height, and the convergence result can be used to acquire the installation parameter vector. Thus, the present invention can use multiple verification methods to compute the installation parameter vector, so as to accurately adjust the rotation angle and/or the inclination angle, the camera height, and the coordinates of the mirror center of the surveillance device, so that the surveillance device can provide the correct object statistics information in accordance with the installation parameter vector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
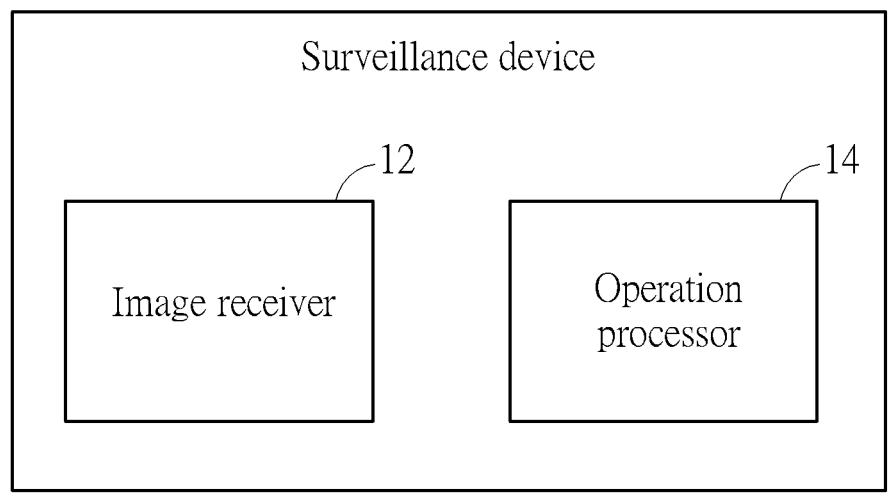
FIG. 1 is a functional block diagram of a surveillance device according to an embodiment of the present invention.

Please refer to FIG. 1. FIG. 1 is a functional block diagram of a surveillance device 10 according to an embodiment of the present invention. The surveillance device 10 can be disposed by the road to analyze a number of pedestrians or vehicles. The surveillance device 10 may utilize a pedestrian height to calibrate an apparatus installation parameter of the surveillance device 10; however, the pedestrian height may be varied due to racial difference in the area where on the surveillance device 10 is located. The surveillance device 10 of the present invention can simultaneously analyze the pedestrian height and a height of another low variability object to accurately calibrate the apparatus installation parameter of the surveillance device 10, so that the surveillance device 10 can provide correct statistics information. The low variability object can be a specific part of the vehicle, such as the tire; the height of the low variability object may further be a height of the motorcycle or the bicycle, which depends on an actual demand.

Figure 2:
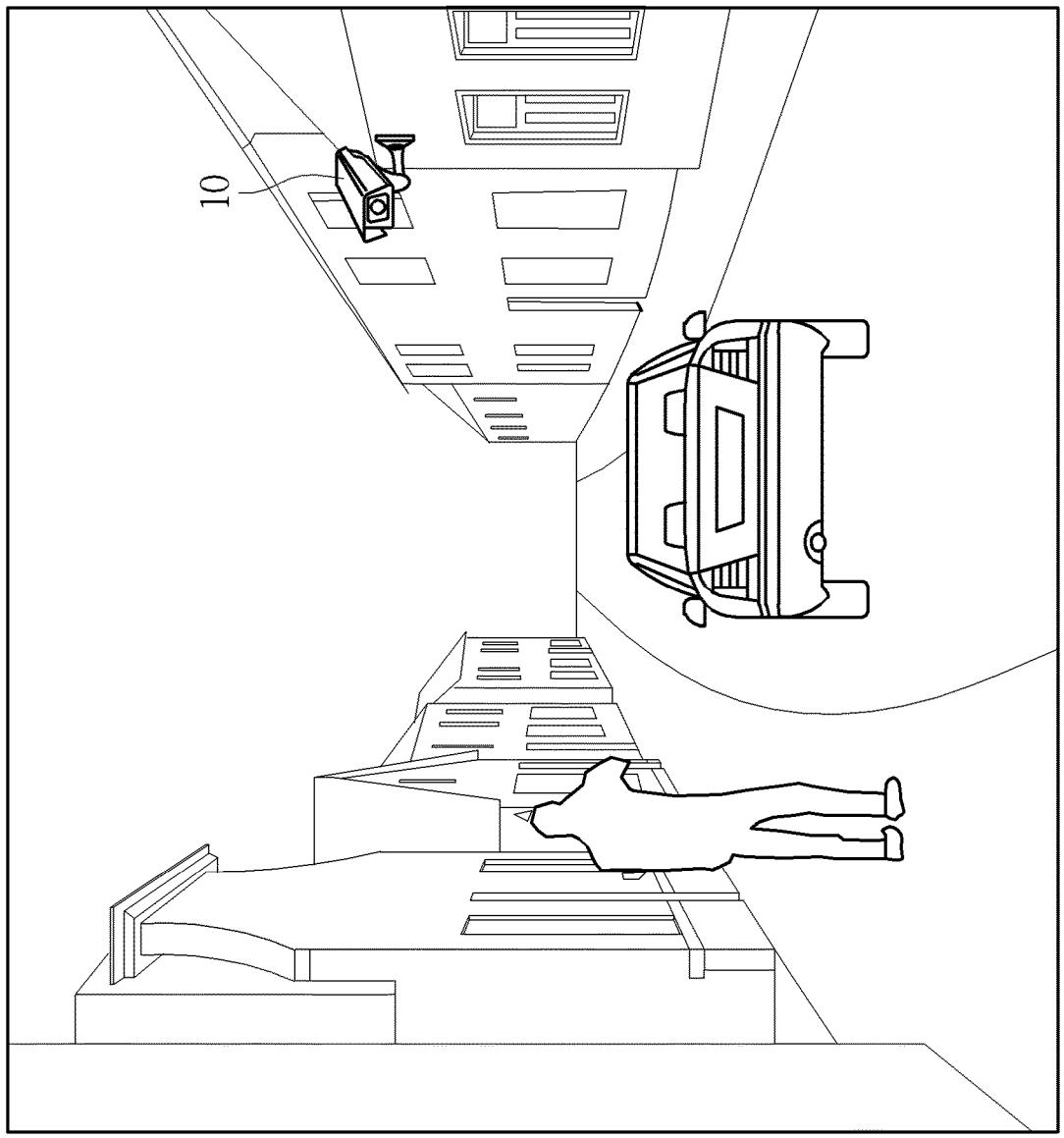
FIG. 2 is a scenario diagram of the surveillance device according to the embodiment of the present invention.
Figure 3:
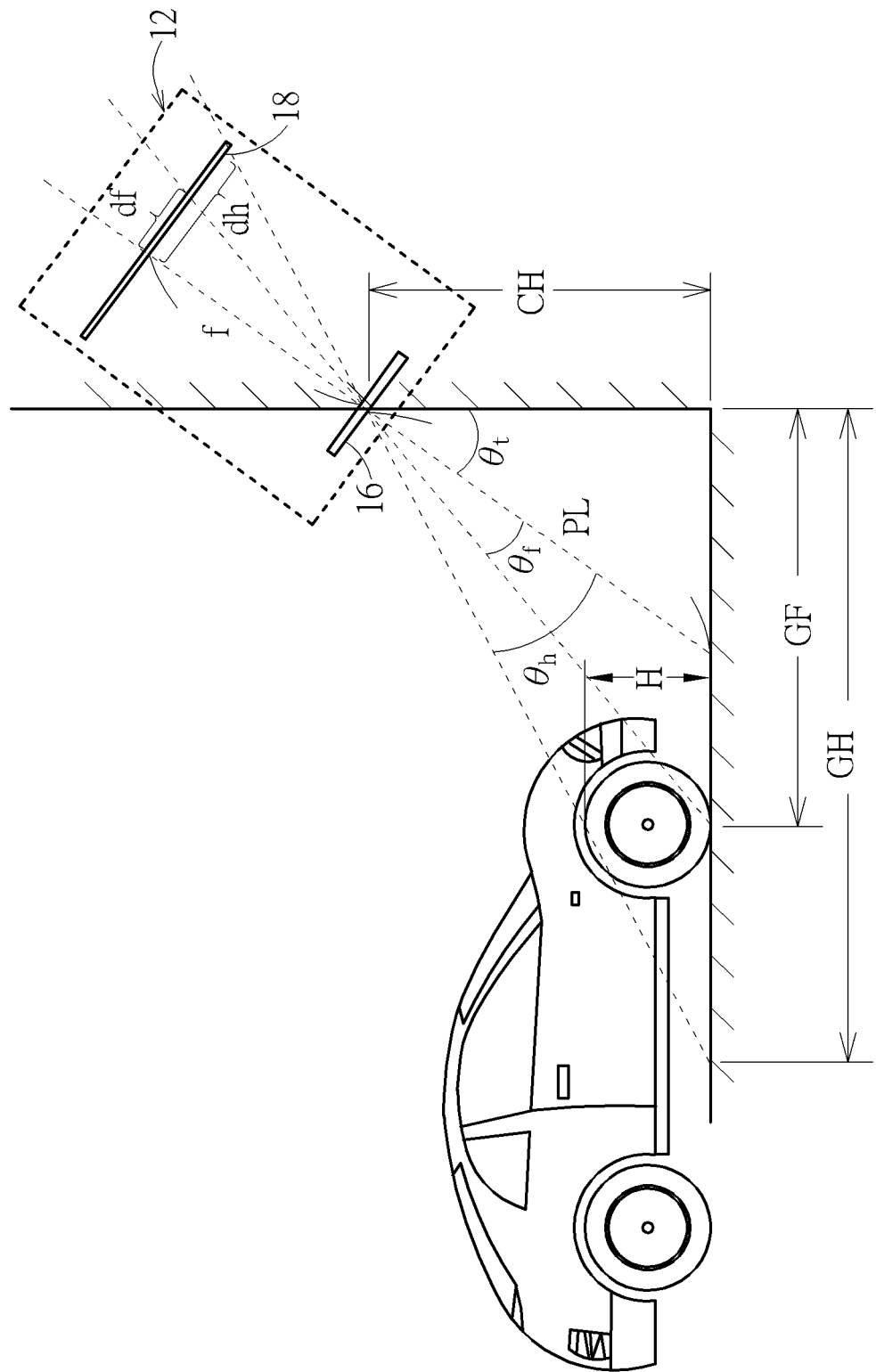
FIG. 3 is a diagram of marking parameters relevant to the surveillance device according to the embodiment of the present invention.
Figure 4:
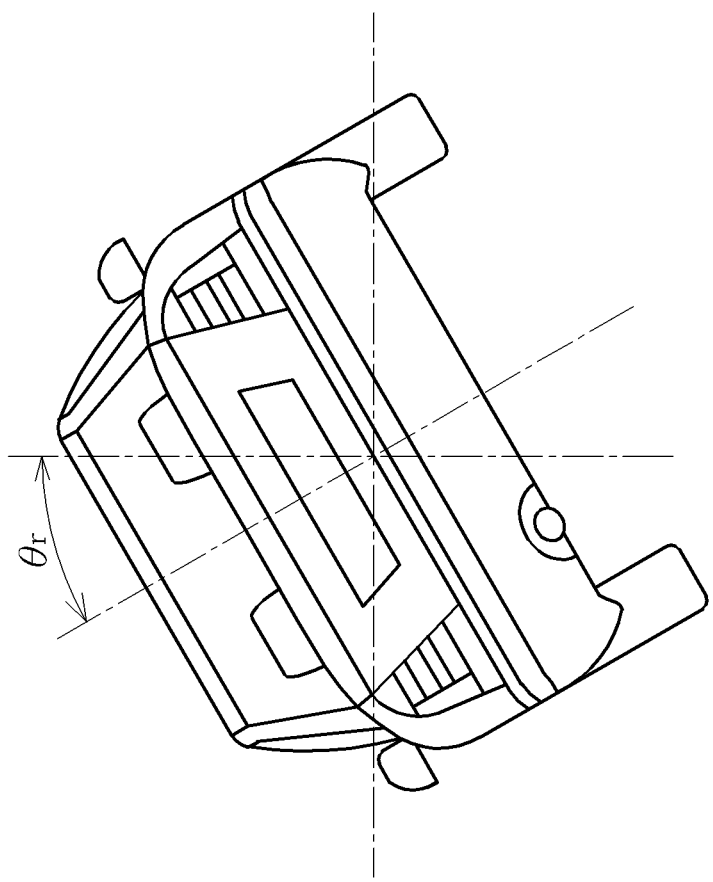
FIG. 4 is a diagram of an object observed by the surveillance device in another view according to the embodiment of the present invention.

Please refer to FIG. 2 to FIG. 4. FIG. 2 is a scenario diagram of the surveillance device 10 according to the embodiment of the present invention. FIG. 3 is a diagram of marking parameters relevant to the surveillance device 10 according to the embodiment of the present invention. FIG. 4 is a diagram of an object observed by the surveillance device 10 in another view according to the embodiment of the present invention. The surveillance device 10 can include an image receiver 12 and an operation processor 14. The image receiver 12 can receive a detection image relevant to a surveillance range of the surveillance device 10. The image receiver 12 can be a camera used to directly capture the detection image, or can be a data transmitter used to receive the detection image captured by an external camera. The operation processor 14 can be electrically connected to the image receiver 12 in a wire manner or in a wireless manner, and execute a calibration method applied for the apparatus installation parameter of the present invention.

Figure 5:
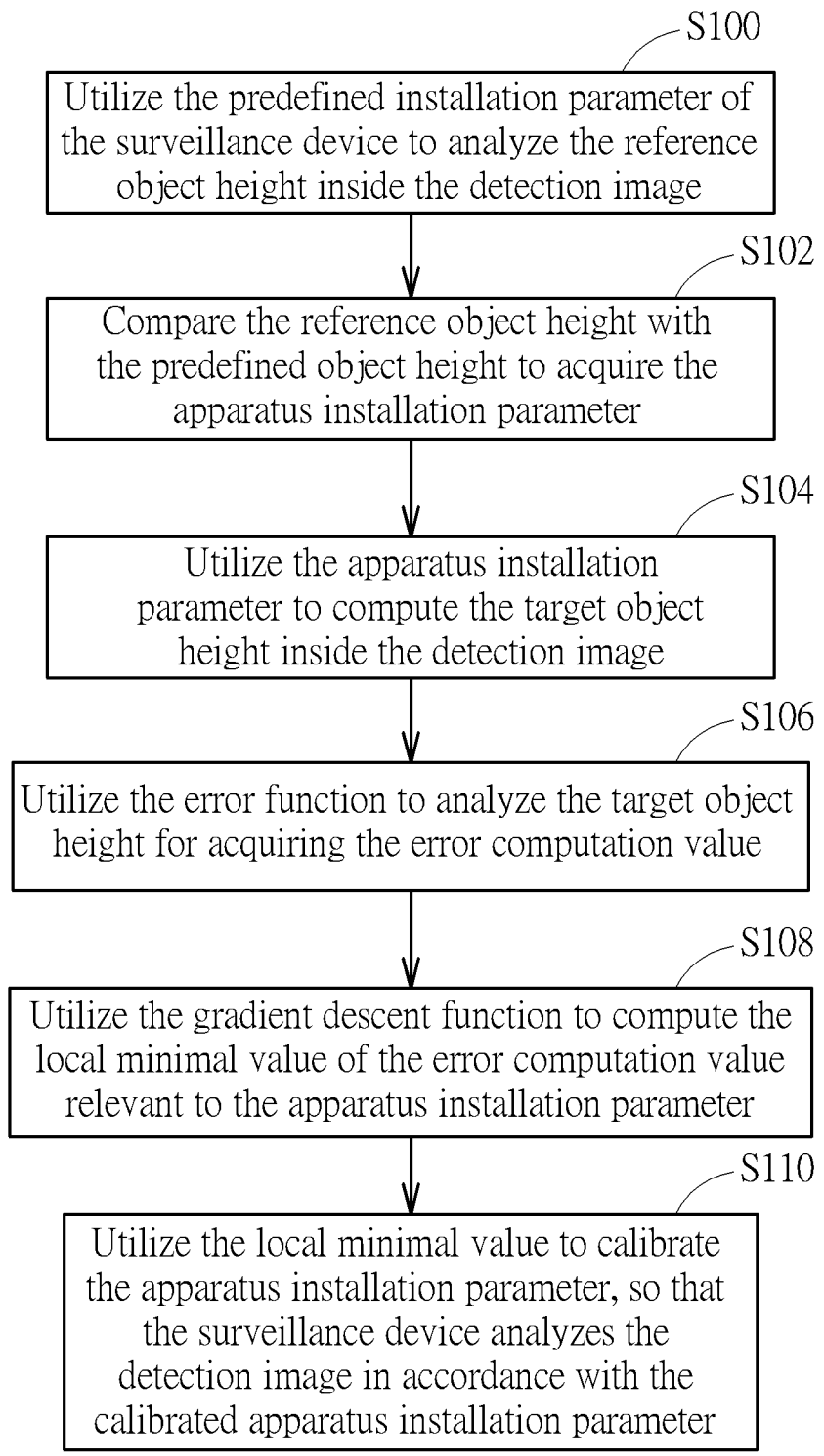
FIG. 5 is a flow chart of the calibration method applied for the apparatus installation parameter according to the embodiment of the present invention.

Please refer to FIG. 3 to FIG. 5. FIG. 5 is a flow chart of the calibration method applied for the apparatus installation parameter according to the embodiment of the present invention. The calibration method applied for the apparatus installation parameter illustrated in FIG. 5 can be suitable for the surveillance device 10 shown in FIG. 1 to FIG. 3. In the calibration method applied for the apparatus installation parameter, step S100 and step S102 can be executed to utilize a predefined installation parameter of the surveillance device 10 to analyze a reference object height inside the detection image, and to compare the reference object height with a predefined object height for acquiring the apparatus installation parameter. The predefined installation parameter can be a rotation angle in a right direction and in a left direction and/or an inclination angle in an upward direction and in a downward direction of the camera that captures the detection image. The reference object height can be the pedestrian height inside the surveillance range. The predefined object height can be a human average height of the area where on the surveillance device 10 is located.

The rotation angle in the right direction and in the left direction and the inclination angle in the upward direction and in the downward direction of the camera can be known data when the surveillance device 10 is installed. The surveillance device 10 can analyze the predefined installation parameter to compute a ratio of the reference object height to the predefined object height via common trigonometric operation, so as to determine the apparatus installation parameter of the surveillance device 10, such as a camera height CH. In the meantime, the camera height CH is an estimated value in need of further calibration. Then, step S104 can be executed to utilize the camera height CH to compute a target object height H inside the detection image via the common trigonometric operation. The target object height H can be the pedestrian height or the tire height, which depends on the actual demand.

As shown in FIG. 3 and FIG. 4, the apparatus installation parameter can further include a camera inclination angle $\theta_t$ and a camera rotation angle $\theta_r$, a distance f between the sensor 16 and the lens plane 18 of the image receiver 12, an interval df between an object bottom point detected by the sensor 16 and a center of the sensor 16, another interval dh between an object top point detected by the sensor 16 and the center of the sensor 16, a length GH of the object top point detected by the sensor 16 projected onto the ground, a length GF of the object bottom point detected by the sensor 16 projected onto the ground, an interval PL between a mirror center of the sensor 16 and a projection point of the mirror center projected onto the ground. An angle formed between a focal line of the sensor 16 and a projection point of the object bottom point can be set as $\theta_f$, an angle formed between the focal line of the sensor 16 and a projection point of the object top point can be set as $\theta_h$. The present invention can provide following formulas via the common trigonometric operation: formula 1 is represented as scale relation between the camera height CH and the target object height H, formula 2 and formula 3 are represented as computation values of the angle $\theta_f$ and the angle $\theta_h$, formula 4 is represented as a computation value of the angle $\theta_f$, and formulas 1-4 can be transformed into formula 5 for the computation formula of the target object height H.

$$\frac{CH}{GH} = \frac{H}{GH - GF} \quad \text{Formula 1}$$

$$\frac{df}{f} = \tan\theta_f \quad \text{Formula 2}$$

$$\frac{dh}{f} = \tan\theta_h \quad \text{Formula 3}$$

$$PL \times \cos\theta_t = CH \quad \text{Formula 4}$$

$$H = CH\left(1 - \frac{\tan\left(a\tan\left(\frac{df}{f}\right) + \theta_t\right)}{\tan\left(a\tan\left(\frac{dh}{f}\right) + \theta_t\right)}\right) \quad \text{Formula 5}$$

Besides, coordinates corresponding to the mirror center c of the detection image can be defined as (cx, cy). The detection image can have a reference object bottom point pf, and coordinates corresponding to a target object bottom point nPf inside the detection image can be defined as (nPfx, nPfy), and coordinates corresponding to a target object top point nPh inside the detection image can be defined as (nPhx, nPhy). The present invention can utilize the common trigonometric operation to acquire formula 6, and the formula 6 can be transformed into formula 7 and formula 8 so as to generate formula 9 for computing the interval df; formula 10 that is used to compute the interval dh can be acquired in a similar way. Therefore, the camera height CH, the distance f, the interval df, the interval dh and the camera inclination angle $\theta_t$ are the known data in formula 5 for computing the target object height H. The foresaid formulas express height calculation in a direct manner, but actual application is not limited thereto; for example, rotation of the three-dimensional matrix can be used to compute the object height.

$$nPf = \begin{vmatrix} \cos\theta_r & -\sin\theta_r \\ \sin\theta_r & \cos\theta_r \end{vmatrix} \times (pf - c) + c \quad \text{Formula 6}$$

$$nPfx = \cos\theta_r \times (Pfx - cx) - \sin\theta_r \times (Pfy - cy) + cx \quad \text{Formula 7}$$

$$nPfy = \sin\theta_r \times (Pfx - cx) + \cos\theta_r \times (Pfy - cy) + cy \quad \text{Formula 8}$$

$$df = \sqrt{(nPfx - cx)^2 + (nPfy - cy)^2} \quad \text{Formula 9}$$

-continued $$dh = \sqrt{(nPhx - cx)^2 + (nPhy - cy)^2}$$ Formula 10

Generally, the surveillance device 10 of the present invention can acquire several target object heights H for accurately calibrating the apparatus installation parameter. The calibration method applied for the apparatus installation parameter can execute step S106 and step S108 to utilize an error function to analyze the target object height H for acquiring an error computation value E, and further utilize a gradient descent function to compute a local minimal value $E_m$ of the error computation value E, wherein the local minimal value $E_m$ corresponds to a vector P of the apparatus installation parameter. In formula 11, the error function can compute an absolute value or a squared value of a difference between the target object height H (or can be set as $H_j$ due to an actual number) and the predefine target height H; parameters i, j, m can be positive integers. In formula 12, the gradient descent function can utilize a learning rate η to compute a gradient variation ∇E of the error computation value E relevant to the apparatus installation parameter for convergence of the local minimal value, so as to acquire an installation parameter vector $P_m$. The error function and the gradient descent function are not limited to the foresaid formulas, and the present invention can optionally apply other common error function and other common gradient variation for the calibration method.

A number of the target object height H can depend on the parameter j. The predefine target height H can be the known tire height; different regions usually have uniform tire specifications, so that the present invention can utilize the tire specification to calibrate the apparatus installation parameter computed by the pedestrian height. The target object is not limited to the tire; any object having the same specification in different countries and areas can belong to a design scope of the present invention. In addition, the learning rate η can be a variable parameter, which can be optimally adjusted by an optimization calculus function of the deep learning, such as Momentum calculation, Adagrad calculation, or Adam calculation. The gradient variation ∇E of the error computation value E can be computed according to different apparatus installation parameters, such as $$\nabla E: \frac{\partial E}{\partial \theta_t}, \frac{\partial E}{\partial \theta_r}, \frac{\partial E}{\partial CH}, \frac{\partial E}{\partial cx}, \frac{\partial E}{\partial cy}.$$

The gradient variation ∇E of the error computation value E can be further optionally computed according to other apparatus installation parameter, which depends on a design demand.

$$E_i = \Sigma_j (H_j - \hat{H})^2$$ Formula 11

$$P_{i+1} = P_i - \eta \nabla E_i(P_i)$$ Formula 12

$$P_m = \arg\min \Sigma_i E_i$$ Formula 13

Final, the calibration method applied for the apparatus installation parameter can execute step S110 to find out the local minimal value $E_m$, and then the installation parameter vector Pm can be acquired accordingly; the foresaid calibration can be interpreted as formula 13, and a detailed description is omitted herein for simplicity. The apparatus installation parameter (such as the camera height CH, the camera inclination angle $\theta_t$, the camera rotation angle $\theta_r$, and the coordinates of the mirror center c) can be calibrated through the target object with the same specification in different countries and regions, so that the surveillance device 10 can analyze the detection image via the installation parameter vector accurately. It should be mentioned that the calibration method applied for the apparatus installation parameter of the present invention can optionally apply normalization process to the apparatus installation parameter, for increasing the calibration efficiency of the apparatus installation parameter. For example, the camera height CH can be constrained in a specific height range, the camera inclination angle $\theta_t$ and the camera rotation angle $\theta_r$ can be constrained in a specific angle range, and the coordinates of the mirror center c can be constrained in a specific pixel number, so as to limit a range of the foresaid parameters between 1 and −1. The limitation range of the normalization process can depend on the design demand, and a detailed description is omitted herein for simplicity.

In formula 11, calibration accuracy of the apparatus installation parameter can be affected by the target object height H. The present invention provides several manners of acquiring the target object height H to generate the preferred calibration accuracy. For example, the calibration method applied for the apparatus installation parameter can acquire a current coordinate value and a following coordinate value of the target object inside the detection image at different points of time, and compute the difference between the current coordinate value and the following coordinate value to compare with a predefined threshold. If the difference is greater than the predefined threshold, the target object has sufficient movement, and the following coordinate value can be reserved to acquire the corresponding detection value, such as the target object height H on the said coordinates. If the difference is equal to or smaller than the predefined threshold, the following coordinate value can be deleted. In the embodiment, the current coordinate value and the following coordinate value can be position data based on a contact foot point of the target object touching the ground, or the position data based on an object marker point generated by common object identification technology. The object marker point can be mass center, a gravity center or a geometric center of the target object, which depends on the design demand.

Moreover, the calibration method applied for the apparatus installation parameter can further compute a maximal track value and a minimal track value of the target object inside the detection image in a specific direction, and compute a difference between the maximal track value and the minimal track value to compare with another predefined threshold. This embodiment is aimed to find out the target object having significant position change when being moved. The specific direction can be a vertical axis, a horizontal axis, or a specific inclined axis of the detection image. If the target object is moved around and returned to an original position, the present invention can determine whether a total track of its movement is greater than a predefined movement threshold in the specific direction for further computation.

The calibration method applied for the apparatus installation parameter can further acquire a plurality of distances of the target object relative to an image center of the detection image in different positions, and a distance mean value of the plurality of distances, and then compute a plurality of angles of the target object relative to the image center in different positions when the target object is moved. It should be mentioned that the image center is not limited to a three dimensional coordinate center or a two dimensional coordinate center of the detection image, and depends on the actual demand. The calibration method applied for the apparatus installation parameter can compare the distance mean value or a maximal angle of the plurality of angles with the predefined threshold, or compare a computation value of the distance mean value and the maximal angle with the predefined threshold, and decide whether to reserve or delete a newer detection result generated by the target object in each movement in accordance with a comparison result in the foresaid identification rules.

Besides, the calibration method applied for the apparatus installation parameter can also combine the foresaid determination manners to compute variation of image coordinates of the target object inside the detection image in the specific direction, and compare the variation with the predefined threshold, or compare the computation value of the distance mean value, the maximal angle and the variation with the predefined threshold, and decide whether to reserve or delete the newer detection result generated by the target object in each movement in accordance with a comparison result in the foresaid identification rules. The calibration method applied for the apparatus installation parameter of the present invention can effectively prevent sampling points of the target object from concentrating within a small range so as to significantly increase the calibration efficiency and even the identification efficiency of the surveillance device 10.

In conclusion, the calibration method applied for the apparatus installation parameter and the surveillance device of the present invention can utilize the predefined installation parameter to compute the reference object height inside the detection image, and compare the reference object height with the predefined object height for estimating the apparatus installation parameter of the surveillance device. Since the predefined object heights in different countries or regions are different, the present invention can further utilize the estimated apparatus installation parameter to compute the target object height inside the detection image; the target object can have the same specification in different countries or regions. Then, the present invention can further utilize the commonly used or the specially designed error function and the gradient descent function to converge the target object height, and the convergence result can be used to acquire the installation parameter vector. Thus, the present invention can use multiple verification methods to compute the installation parameter vector, so as to accurately adjust the rotation angle and/or the inclination angle, the camera height, and the coordinates of the mirror center of the surveillance device, so that the surveillance device can provide the correct object statistics information in accordance with the installation parameter vector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method applied for at least one apparatus installation parameter of a surveillance device having an image receiver and an operation processor, the calibration method comprising:
   the operation processor analyzing a detection image from the image receiver to acquire the apparatus installation parameter of the surveillance device;
   the operation processor computing at least one target object height inside the detection image in accordance with the apparatus installation parameter;
   the operation processor utilizing an error function to analyze the at least one target object height for acquiring an error computation value;
   the operation processor utilizing a gradient descent function to compute a local minimal value of the error computation value, wherein the local minimal value relevant to the apparatus installation parameter; and
   the operation processor acquiring an installation parameter vector by the local minimal value so that the surveillance device analyzes the detection image in accordance with the installation parameter vector;
   wherein the gradient descent function is applied to utilize a learning rate to compute gradient variation of the error computation value relevant to the apparatus installation parameter for convergence of the local minimal value.

2. The calibration method of claim 1, further comprising:
   the operation processor utilizing a predefined installation parameter to analyze a relation between a reference object height and a predefined object height inside the detection image for acquiring the apparatus installation parameter.

3. The calibration method of claim 2, wherein the reference object height corresponds to a symbol H, a camera height of the apparatus installation parameter corresponds to a symbol CH, an inclination angle of the apparatus installation parameter corresponds to a symbol θt, an interval between a sensor and a lens plane of the image receiver corresponds to a symbol f, an interval between an object bottom point of the sensor and a center of the sensor corresponds to a symbol df, an interval between an object top point of the sensor and the center of the sensor corresponds to a symbol Dh, and a computation formula of the symbol H is:

$$H = CH\left(1 - \frac{\tan\left(a\tan\left(\frac{df}{f}\right) + \theta_t\right)}{\tan\left(a\tan\left(\frac{dh}{f}\right) + \theta_t\right)}\right).$$

4. The calibration method of claim 3, wherein coordinates of a mirror center of the detection image is set as a parameter cx and a parameter xy, coordinates of at least one target object bottom point inside the detection image is set as a parameter nPfx and a parameter nPfy, coordinates of at least one target object top point inside the detection image is set as a parameter nPhx and a parameter nPhy, and computation formulas of the symbol df and the symbol dh are:

$$df = \sqrt{(nPfx-cx)^2 + (nPfy-cy)^2};$$

$$dh = \sqrt{(nPhx-cx)^2 + (nPhy-cy)^2}.$$

5. The calibration method of claim 1, further comprising:
   the operation processor computing a plurality of distances of at least one target object relative to an image center of the detection image in different positions, and further computing a distance mean value of the plurality of distances;
   the operation processor computing a plurality of angles of the at least one target object relative to the image center in different positions; and
   the operation processor analyzing at least one of the distance mean value and a maximal angle of the plurality of angles to decide a detection result of the at least one target object.

6. The calibration method of claim 5, further comprising:
the operation processor comparing the distance mean value, the maximal angle, or a computation value of the distance mean value and the maximal angle with a predefined threshold; and
the operation processor deciding whether to reserve or delete the detection result of the at least one target object in accordance with a comparison result.

7. The calibration method of claim 5, further comprising:
the operation processor computing image coordinates of the at least one target object inside the detection image, and further computing variation of the image coordinates in a specific direction; and
the operation processor comparing the variation with a predefined threshold to decide whether to reserve or delete the detection result of the at least one target object in accordance with a comparison result.

8. A calibration method applied for at least one apparatus installation parameter of a surveillance device having an image receiver and an operation processor, the calibration method comprising:
the operation processor analyzing a detection image from the image receiver to acquire the apparatus installation parameter of the surveillance device, and further to compute a maximal track value and a minimal track value of at least one target object inside the detection image in a specific direction;
the operation processor computing a difference between the maximal track value and the minimal track value to compare with a predefined threshold;
the operation processor deciding whether to reserve or delete a detection result of the at least one target object in accordance with a comparison result;
the operation processor computing at least one target object height inside the detection image in accordance with the apparatus installation parameter;
the operation processor utilizing an error function to analyze the at least one target object height for acquiring an error computation value;
the operation processor utilizing a gradient descent function to compute a local minimal value of the error computation value, wherein the local minimal value relevant to the apparatus installation parameter; and
the operation processor acquiring an installation parameter vector by the local minimal value so that the surveillance device analyzes the detection image in accordance with the installation parameter vector.

9. The calibration method of claim 8, further comprising:
the operation processor utilizing a predefined installation parameter to analyze a relation between a reference object height and a predefined object height inside the detection image for acquiring the apparatus installation parameter.

10. The calibration method of claim 9, wherein the reference object height corresponds to a symbol H, a camera height of the apparatus installation parameter corresponds to a symbol CH, an inclination angle of the apparatus installation parameter corresponds to a symbol θt, an interval between a sensor and a lens plane of the image receiver corresponds to a symbol f, an interval between an object bottom point of the sensor and a center of the sensor corresponds to a symbol df, an interval between an object top point of the sensor and the center of the sensor corresponds to a symbol Dh, and a computation formula of the symbol H is:

$$H = CH\left(1 - \frac{\tan\left(a\tan\left(\frac{df}{f}\right) + \theta_t\right)}{\tan\left(a\tan\left(\frac{dh}{f}\right) + \theta_t\right)}\right).$$

11. The calibration method of claim 10, wherein coordinates of a mirror center of the detection image is set as a parameter cx and a parameter xy, coordinates of at least one target object bottom point inside the detection image is set as a parameter nPfx and a parameter nPfy, coordinates of at least one target object top point inside the detection image is set as a parameter nPhx and a parameter nPhy, and computation formulas of the symbol df and the symbol dh are:

$$df = \sqrt{(nPfx - cx)^2 + (nPfy - cy)^2};$$

$$dh = \sqrt{(nPhx - cx)^2 + (nPhy - cy)^2}.$$

12. The calibration method of claim 8, wherein the gradient descent function is applied to utilize a learning rate to compute gradient variation of the error computation value relevant to the apparatus installation parameter for convergence of the local minimal value.

13. The calibration method of claim 8, further comprising:
the operation processor computing a plurality of distances of at least one target object relative to an image center of the detection image in different positions, and further computing a distance mean value of the plurality of distances;
the operation processor computing a plurality of angles of the at least one target object relative to the image center in different positions; and
the operation processor analyzing at least one of the distance mean value and a maximal angle of the plurality of angles to decide a detection result of the at least one target object.

14. The calibration method of claim 13, further comprising:
the operation processor comparing the distance mean value, the maximal angle, or a computation value of the distance mean value and the maximal angle with a predefined threshold; and
the operation processor deciding whether to reserve or delete the detection result of the at least one target object in accordance with a comparison result.

15. The calibration method of claim 13, further comprising:
the operation processor computing image coordinates of the at least one target object inside the detection image, and further computing variation of the image coordinates in a specific direction; and
the operation processor comparing the variation with a predefined threshold to decide whether to reserve or delete the detection result of the at least one target object in accordance with a comparison result.

16. A calibration method applied for at least one apparatus installation parameter of a surveillance device having an image receiver and an operation processor, the calibration method comprising:
the operation processor analyzing a detection image from the image receiver to acquire the apparatus installation parameter of the surveillance device, and further to compute a plurality of distances of at least one target object relative to an image center of the detection image in different positions, and further to compute a distance mean value of the plurality of distances;

the operation processor computing a plurality of angles of the at least one target object relative to the image center in different positions; and the operation processor analyzing at least one of the distance mean value and a maximal angle of the plurality of angles to decide a detection result of the at least one target object;

the operation processor computing at least one target object height inside the detection image in accordance with the apparatus installation parameter;

the operation processor utilizing an error function to analyze the at least one target object height for acquiring an error computation value;

the operation processor utilizing a gradient descent function to compute a local minimal value of the error computation value, wherein the local minimal value relevant to the apparatus installation parameter; and the operation processor acquiring an installation parameter vector by the local minimal value so that the surveillance device analyzes the detection image in accordance with the installation parameter vector.

17. The calibration method of claim 16, further comprising:

the operation processor utilizing a predefined installation parameter to analyze a relation between a reference object height and a predefined object height inside the detection image for acquiring the apparatus installation parameter.

18. The calibration method of claim 17, wherein the reference object height corresponds to a symbol H, a camera height of the apparatus installation parameter corresponds to a symbol CH, an inclination angle of the apparatus installation parameter corresponds to a symbol θt, an interval between a sensor and a lens plane of the image receiver corresponds to a symbol f, an interval between an object bottom point of the sensor and a center of the sensor corresponds to a symbol df, an interval between an object top point of the sensor and the center of the sensor corresponds to a symbol Dh, and a computation formula of the symbol H is:

$$H = CH\left(1 - \frac{\tan\left(\operatorname{atan}\left(\frac{df}{f}\right) + \theta_t\right)}{\tan\left(\operatorname{atan}\left(\frac{dh}{f}\right) + \theta_t\right)}\right).$$

19. The calibration method of claim 16, further comprising:

the operation processor comparing the distance mean value, the maximal angle, or a computation value of the distance mean value and the maximal angle with a predefined threshold; and the operation processor deciding whether to reserve or delete the detection result of the at least one target object in accordance with a comparison result.

20. The calibration method of claim 19, further comprising:

the operation processor computing image coordinates of the at least one target object inside the detection image, and further computing variation of the image coordinates in a specific direction; and the operation processor comparing the variation with a predefined threshold to decide whether to reserve or delete the detection result of the at least one target object in accordance with a comparison result.

* * * * *